United States Patent [19]

Ichimura et al.

[11] 3,997,627

[45] Dec. 14, 1976

[54] POLYESTER MOLDING COMPOSITIONS CONTAINING HYDROXY CONTAINING VINYL MONOMERS AND COATED MOLDED ARTICLES THEREOF

[75] Inventors: Yutaka Ichimura, Tokyo; Takahiro Kishino, Yokohama; Naoyuki Fukahori, Kanagawa, all of Japan

[73] Assignee: Mitsubishi Rayon Co., Ltd., Tokyo, Japan

[22] Filed: Aug. 27, 1974

[21] Appl. No.: 500,858

[30] Foreign Application Priority Data

| Aug. 29, 1973 | Japan | 48-96088 |
| Aug. 29, 1973 | Japan | 48-96089 |
| Sept. 19, 1973 | Japan | 48-104910 |
| Sept. 19, 1973 | Japan | 48-104911 |

[52] U.S. Cl. .................. 260/862; 260/16; 260/835; 260/867; 260/872

[51] Int. Cl.$^2$ ........................... C08L 67/06

[58] Field of Search ............ 260/835, 867, 16, 872, 260/862

[56] References Cited

UNITED STATES PATENTS

| 3,457,324 | 7/1969 | Sekmakas | 260/834 |
| 3,701,748 | 10/1972 | Kroekel | 260/40 |
| 3,711,432 | 1/1973 | Shah | 260/16 |
| 3,760,033 | 9/1973 | Arbuckle et al. | 260/872 |
| 3,801,693 | 2/1974 | Stallings et al. | 260/862 |

*Primary Examiner*—Edward M. Woodberry
*Attorney, Agent, or Firm*—Armstrong, Nikaido & Wegner

[57] ABSTRACT

An unsaturated polyester composition for molding compounds, consisting essentially of (1) 20 to 70 parts by weight of an unsaturated polyester obtained by condensing an acid component comprising a major amount of an $\alpha,\beta$-ethylenically unsaturated dicarboxylic acid with a polyol, (2) 25 to 75 parts by weight of a vinyl monomer copolymerizable with said unsaturated polyester, (3) 1 to 25 parts by weight of a thermoplastic polymer, and (4) at least one member selected from the group consisting of hydroxyl-containing vinyl monomers and epoxy-containing vinyl monomers in a ratio of 1 to 40 parts by weight to 100 parts by weight of said unsaturated polyester (to form 100 parts by weight of the composition). The composition may be molded and cured to yield articles which provide good adhesion to surface coatings and are sesceptible of decorative finishes.

5 Claims, No Drawings

POLYESTER MOLDING COMPOSITIONS CONTAINING HYDROXY CONTAINING VINYL MONOMERS AND COATED MOLDED ARTICLES THEREOF

This invention relates to a molding compound consisting essentially of an unsaturated polyester, a crosslinking agent, and a thermoplastic polymer used as a shrinkage-reducing agent, and to a molded article having excellent performance characteristics and decoratively finished appearance, which is obtained by applying a thermosetting finish coat on a molded product manufactured from said compound.

A fiber-reinforced unsaturated polyester resin composition (hereinafter abbreviated to FRP) comprising an unsaturated polyester resin prepared by condensation of an α,β-ethylenically unsaturated dicarboxylic acid with a polyol, a crosslinking vinyl monomer, a fibrous reinforcement, and further, if necessary, a filler such as calcium carbonate, a mold releasing agent such as zinc stearate, and a thickening agent such as magnesium oxide, is formed into a sheet molding compound (hereinafter abbreviated to SMC) or a bulk molding compound (hereinafter abbreviated to BMC) and widely used as a molding material in manufacturing automobile parts, housings for household appliances, furniture, hand tools, etc. Such SMC and BMC, however, undergo a considerably large degree of shrinkage, resulting in sink-mark in the surface and warpage of the molded article. Consequently, it has been difficult to manufacture molded articles with a high dimensional accuracy and an excellent surface evenness on a continuous mass production basis.

Various methods had been examined to overcome such a disadvantage and as a result there was developed a so-called low-shrinkage FRP manufactured by incorporating a thermoplastic resin in the aforesaid molding compounds to serve as a shrinkage-reducing agent. Such a low-shrinkage FRP has overcome, for the most part, the afore-said disadvantage and, hence, rapidly expanded its use fields.

The FRP's so far developed are currently being used in various fields and when a molded article is desired to be decoratively finished, the BMC or SMC is previously colored with pigments and dyes. Since the molded article obtained from such colored compounds are not evenly colored, it must be finished with a decorative coating. However, since the molded article obtained by using the aforesaid low-shrinkage FRP has inferior adhesion to the coating materials, it has been difficult for the prior art to produce a coated article with satisfactorily decorative and durable finish.

The present inventors conducted various experiments to obtain a FRP molding compound capable of yielding a molded article which does not show sink-marks, yellowish discoloration, nor surface roughness, and which is capable of being applied with a decorative coating material to form a coat having excellent performance characteristics. As a result, it has been found that a compound capable of meeting the above requirements may be obtained by incorporation of at least one member selected from the group consisting of hydroxy-containing vinyl monomers and epoxy-containing vinyl monomers in addition to the vinyl monomer usually used as crosslinking agent.

An object of this invention is to provide an unsaturated polyester composition for molding compounds capable of yielding a molded article having improved adhesiveness to surface coatings.

Another object of this invention is to provide a glass-fiber reinforced unsaturated polyester molded article having on its surface a coating film with excellent performance characteristics and decorative appearance.

Other objects and advantages of this invention will become apparent from the following description.

According to this invention, there is provided an unsaturated polyester composition for molding compounds having good adhesion to coating film, consisting essentially of (1) 20 to 70 parts by weight of an unsaturated polyester obtained by condensing an acid component comprising an α,β-ethylenically unsaturated dicarboxylic acid as the major component with a polyol, (2) 25 to 75 parts by weight of a vinyl monomer copolymerizable with said unsaturated polyester, (3) 1 to 25 parts by weight of a thermoplastic polymer, and (4) at least one member selected from the group consisting of hydroxyl-group-containing vinyl monomers and epoxy-group-containing vinyl monomers in a ratio of 1 to 40 parts by weight to 100 parts by weight of said unsaturated polyester (the sum of (1) to (4) being 100 parts by weight). Further, according to the present invention, there is also provided a coated FRP molded article which is obtained by crosslinking the said composition in the presence of a curing catalyst to cure the composition, and applying a coating on the surface of the resulting FRP molded article, and curing the coating by heating.

The acid component which is used in preparing the unsaturated polyester, one of the components of the present composition, contains as the major component an unsaturated polycarboxylic acid having in its molecule one unsaturated bond and at least two carboxylic groups. Examples of the individual members of the said unsaturated polycarboxylic acids include maleic acid, fumaric acid, chloromaleic acid, itaconic acid, citraconic acid, and anhydrides thereof. Examples of other polycarboxylic acids to be used in combination with the above-noted unsaturated polycarboxylic acids include oxalic acid, malonic acid, succinic acid, adipic acid, sebacic acid, azelaic acid, glutaric acid, phthalic acid, isophthalic acid, terephthalic acid, hexahydrophthalic acid, tetrachlorophthalic acid, diphenic acid, nitrophthalic acid, and anhydrides thereof.

The polyols to be used in preparing the unsaturated polyester are ethylene glycol, propylene glycol, butylene glycol, 1,3-butanediol, 2-methyl-propane-1,3-diol, trimethylolpropane, ethylene glycol carbonate, pentamethylene glycol, diethylene glycol, triethylene glycol, neopentyl glycol, tetraethylene glycol, bisphenol derivatives, and the like.

In preparing the unsaturated polyester by condensation from the aforesaid polycarboxylic acid and polyol, there may be used an ordinary condensation method such as, for example, a procedure in which a predetermined amount of a polycarboxylic acid and that of a polyol are mixed, and the mixture is subjected to dehydrating condensation under an inert atmosphere and at a temperature of around 200° C. to yield the unsaturated polyester.

The vinyl monomers to be used in this invention as crosslinking agent for the unsaturated polyester include, for example, styrene, chlorostyrene, dichlorostyrene, α-methylstyrene, vinylnaphthalene, diallyl phthalate, diallyl maleate, diallyl succinate, ethyl vinyl ether, methyl vinyl ketone, methyl methacrylate, methyl acrylate, ethyl acrylate, acrylonitrile, and methacrylonitrile. These may be used alone or in admixture.

Examples of the thermoplastic resins to be used in this invention as shrinkage-reducing agent include homopolymers of lower alkyl esters of acrylic acid or methacrylic acid, preferably $C_{1-4}$-alkyl acrylates and methacrylates such as, for example, methyl methacrylate, ethyl methacrylate, butyl methacrylate, methyl acrylate, and ethyl acrylate; styrene; vinyl chloride; and vinyl acetate; copolymers among these monomers; copolymers of at least one of these monomers with at least one monomer selected from the group consisting of lauryl methacrylate, isobornyl methacrylate, acrylamide, methacrylamide, hydroxyalkyl acrylates or methacrylates, acrylontrile, methacrylonitrile, unsaturated carboxylic acids (for example, acrylic acid, methacrylic acids, and the like), and cetylstearyl methacrylate (particularly preferred are copolymers from 95 to 99.5 % by weight of $C_{1-4}$-alkyl acrylates or methacrylates and 0.5 to 5 % by weight of unsaturated carboxylic acids); cellulose acetate butyrate; cellulose acetate propionate; polyolefins (for example, polyethylene, polypropylene, and the like); and saturated polyesters.

The hydroxyl-containing vinyl monomers to be used in this invention include mono-, di-, and tri-hydroxy unsaturated compounds obtained by monoesterification of polyols with $\alpha,\beta$-ethylenically unsaturated monocarboxylic acids. Examples of $\alpha,\beta$-ethylenically unsaturated monocarboxylic acids to be used in preparing such vinyl monomers are acrylic acid, methacrylic acid, crotonic acid, monoesters of itaconic acid, monoesters of $\alpha$-methyleneglutaric acid, monoesters of maleic acid, and those monocarboxylic acids which are represented by the formula:

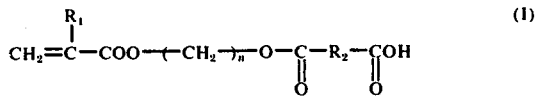
(I)

wherein $R_1$ represents hydrogen atom or methyl group, $R_2$ represents the grouping $-CH_2CH_2-$, $-CH = CH-$, or

and $n$ is an integer from 1 to 10. Examples of the polyols to be used are ethylene glycol, propylene glycol, butylene glycol, hexylene glycol, trimethylolpropane, glycerol, neopentyl glycol, polyethylene glycol, polypropylene glycol, etc.

It is also possible to use, beside the above-noted hydroxyl-containing vinyl monomers, the compounds represented by the following formulas:

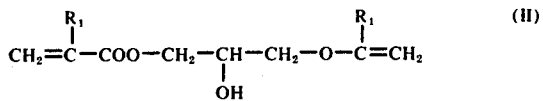
(II)

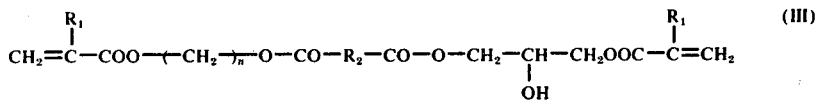
(III)

wherein $R_1$, $R_2$ and $n$ have the same meanings as defined above.

Of the hydroxyl-containing vinyl monomers listed above, preferred are monoesters of polyols having 2 to 6 carbon atoms with $\alpha,\beta$-monoethylenically unsaturated monocarboxylic acids and monoesters of the polyols of the formula,

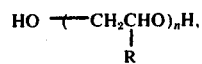

wherein R is H or $CH_3$ and $n$ is an integer from 2 to 6, with said monocarboxylic acids and particularly preferred are 2-hydroxyethyl acrylate and methacrylate, 2-hydroxypropyl acrylate and methacrylate, 3-hydroxypropyl acrylate and methacrylate, diethylene glycol monoacrylate and monomethacrylate, dipropylene glycol monoacrylate and monomethacrylate.

The epoxy-containing monomers to be used in this invention include various monomers such as the reaction products of $\alpha,\beta$-ethylenically unsaturated carboxylic acids and epichlorohydrin, and monoesterification products of diepoxy compounds with said carboxylic acids. Of these, particularly preferred are glycidyl acrylate, glycidyl methacrylate, allyl glycidyl ether, and methallyl glycidyl ether.

It is necessary for the present unsaturated polyester composition for molding compounds to combine 20 to 70 parts by weight of an unsaturated polyester, 25 to 75 parts by weight of a vinyl monomer copolymerizable with said unsaturated polyester, 1 to 25 parts by weight of a thermoplastic polymer, and at least one member selected from the group consisting of hydroxyl-containing vinyl monomers and epoxy-containing vinyl monomers in a ratio of 1 to 40 parts by weight to 100 parts by weight of said unsaturated polyester, to make a total of 100 parts by weight of the composition. A molded article made from a composition containing less than 20 parts by weight of an unsaturated polyester cannot have excellent mechanical strengths nor excellent chemical characteristics, while a composition containing more than 70 parts by weight of an unsaturated polyester is undesirable because of its worse moldability and deterioration in physical properties, such as impact strength, of the molded article obtained from such a composition. A composition in which less than 25 parts by weight of a crosslinking vinyl monomer were used shows deterioration in its moldability, while a composition in which more than 75 parts by weight of said vinyl monomer were used is undesirable because of deterioration in mechanical and chemical characteristics of the molded article obtained from such a composition.

The thermoplastic resin is a component necessary for controlling shrinkage of the present composition during the molding operation. When it is used in an amount of less than 1 part by weight, the intended object of its addition can no longer be achieved, while it is also undesirable to use more than 25 parts by weight of said resin because the resulting composition will be deteriorated in chemical characteristics such as the resistance to water and chemicals, in mechanical characteristics such as mar resistance, in adhesion of the molded article obtained from such a composition to a coating material when decorative finish is desired, and also in gloss and weatherability of the applied coating. The hydroxyl-group-containing vinyl monomer and/or the epoxy-group-containing monomer is a component used to improve markedly the adhesion between a coating material and the molded article obtained from the composition. If it is used in an amount of less than 1 part by weight per 100 parts by weight of the unsaturated polyester, the object of this invention can no longer be achieved, while if it is used in an amount exceeding 40 parts by weight, not only the composition becomes difficultly workable due to excessive viscosity increase and other undesirable phenomena, but also the molded article obtained from such a composition becomes deteriorated in chemical characteristics such as the resistance to water and chemicals, and in gloss, weatherability, and water resistance of the coating applied on the article.

Before fabricating a FRP molded article from the unsaturated polyester resin composition of this invention, the composition is admixed with a crosslinking catalyst such as benzoyl peroxide, lauroyl peroxide, p-chlorobenzoyl peroxide, methyl ethyl ketone peroxide, dicumyl peroxide, 2,2′-bis(4,4-di-tert-butylperoxycyclohexylpropane), tert-butyl perbenzoic amide, or the like. The composition is further incorporated with an inorganic or organic fibrous reinforcement and a suitable combination of additives such as fillers, thickening agents, mold releasing agents, antioxidants, etc., and formed into molding compounds by the procedures used for manufacturing ordinary SMC and BMC. The compound thus formed is introduced into a mold and cured by crosslinking under application of heat and pressure to yield the molded article.

Owing to the hydroxyl-group-containing vinyl monomer and/or the epoxy-group-containing vinyl monomer contained in the specified amount in the molding compound of this invention as mentioned above, the molded article fabricated from the compound shows very good adhesion to a coating material. Accordingly, the coated FRP product obtained by applying a finish coating on said molded article will not be subject to peeling of the coating film when used under severe conditions and can retain fine appearance, surface smoothness, and bright color.

The composition of this invention can be formed into BMC and SMC without any difficulty nor any loss in the low-shrinkage characteristic. The composition can be fabricated into molded articles also without being accompanied by any disadvantageous phenomenon such as discoloration or deterioration in surface evenness.

The coatings applicable on the molded articles obtained from the molding compounds of this invention include lacquers, varnishes, alkyd-type coatings, acrylic coatings, amino resin coatings, and coatings curable by crosslinking on exposure to light and radiation. Of these, particularly preferred are those coatings which cure by crosslinking.

The alkyd-type coating material, one of the coating materials curable by crosslinking, is prepared by condensation of a polyol with a polybasic acid using a modifier such as linseed oil, soybean oil, rapeseed oil, cotton seed oil, tung oil, castor oil, ricinolic acid, coconut oil fatty acid; fatty acid glyceride such as, for example, mixed glyceride of linolic acid and linolenic acid; palmitic acid, oleic acid, stearic acid, fish oil, fish oil fatty acid, or the like. The polybasic acids and polyols to be used are the same as those for use in preparing the unsaturated polyesters mentioned above. The condensation may be carried out in an ordinary way.

The amino resin coatings to be used are those containing butylated melamine or urea resin as the main component and amino-alkyd coatings which contain both amino and alkyd resins.

The acrylic coatings to be used contain as the major component a copolymer prepared from a mixture comprising 0.1 to 10 %, preferably 0.5 to 10 %, by weight of at least one $\alpha,\beta$-monoethylenically unsaturated carboxylic acid such as acrylic acid, methacrylic acid, itaconic acid, or the like, 2 to 50 % by weight of at least one monomer represented by the formula:

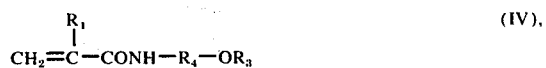

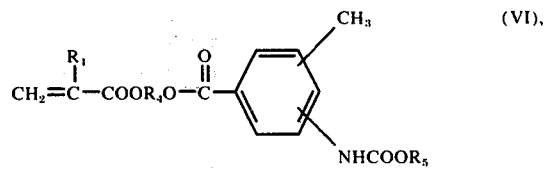

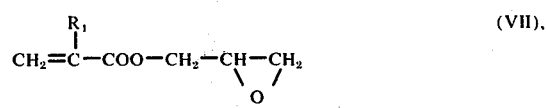

wherein $R_1$ is hydrogen or methyl group, $R_3$ represents an alkyl group having 1 to 8 carbon atoms, $R_4$ represents an alkyl group having 1 to 8 carbon atoms, and $R_5$ represents the grouping

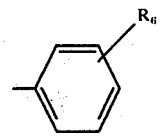

($R_6$ is hydrogen or an alkyl group having 1 to 12 carbon atoms), and 40 to 97.9 %, preferably 40 to 97.5 %, by weight of at least one of other copolymerizable vinyl monomers. The coatings may contain, if necessary, a crosslinking agent, such as an aminoplast, epoxy resin, polycarboxylic acid, amino acid, masked polyisocyanate, or the like, which, together with the above-noted copolymer, forms a resin composition.

Preferable examples of the N-alkoxyalkylacrylamides and -methacrylamides represented by the formula (IV), which are used in preparing acrylic resins, are methoxymethyl-acrylamide or -methacrylamide, ethoxymethyl-acrylamide or -methacrylamide, butoxymethylacrylamide or -methacrylamide. Preferable examples of the hydroxyalkyl acrylates and methacrylates represented by the formula (V) are 2-hydroxyethyl acrylate and methacrylate, 2-hydroxypropyl acrylate and methacrylate, 3-hydroxyhexyl acrylate and methacrylate, 8-hydroxyoctyl acrylate and methacrylate, etc. Preferable examples of the compounds represented by the formula (VI) are

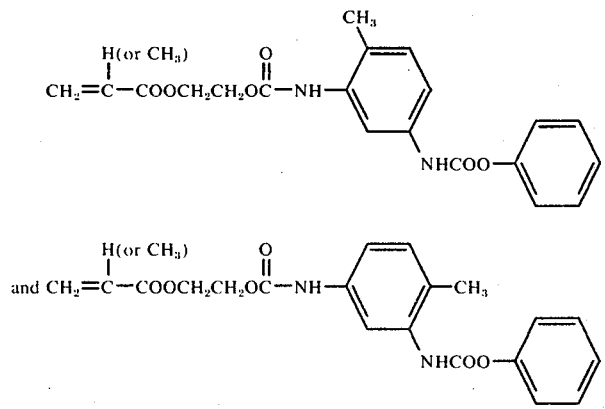

Preferable examples of the monomers represented by the formula (VII) are glycidyl acrylate and methacrylate.

Preferable examples of other copolymerizable vinyl monomers include acrylates and methacrylates obtained by reacting acrylic acid or methacrylic acid with monohydric alcohols such as, for example, methanol, ethanol, propanol, isopropanol, butanol, hexanol, cyclohexanol, decanol, lauryl alcohol, benzyl alcohol, and phenethyl alcohol; styrene; vinyltoluene; vinyl chloride; vinylidene chloride; vinylidene fluoride; acrylamide; methacrylamide; acrylonitrile; methacrylonitrile; vinyl acetate; and vinyl propionate.

Examples of the unsaturated carboxylic acids are acrylic acid, methacrylic acid, crotonic acid, itaconic acid, α-methyleneglutaric acid, and carboxylic acids of the formula (I).

The acrylic resin can be prepared by mass polymerization or solution polymerization of a mixture of predetermined quantities of the above-noted monomers. The solvents to be used in the solution polymerization are aromatic hydrocarbons such as benzene, toluene, and xylene; aliphatic alcohols such as ethanol, butanol, propanol, and isopropanol; ketones such as methyl ethyl ketone and acetone; and ethylene glycol monoalkyl ethers. The acrylic resin thus obtained may be used in the form of powder, organic solution, or aqueous coating material which is formed by neutralizing the resin solution formed by the solution polymerization with an alkali and diluting with water or replacing the organic solvent with water.

The crosslinking agents, which are added if necessary, include condensation products of aldehydes with urea, N,N-ethyleneurea, dicyandiamide, or aminotriazine; aminoplasts etherified with alcohols having 1 to 6 carbon atoms; isocyanates such as hexamethylene diisocyanate, tolylene diisocyanate, lysine isocyanate, xylene diisocyanate, m-phenylene diisocyanate, biphenylene diisocyanate; polyisocyanates which are addition products of the above-noted isocyanates with water, trimethylolpropane or the like; said polyisocyanates blocked with phenol or caprolactam; phthalic acid; terephthalic acid; adipic acid; sebacic acid; and epoxy compounds having an epoxy equivalent of 100 to 2,000, such as, for example, Epikote 828, 834, 1001, and 1004 (products of Shell Chemical Co.) which are condensation products of bisphenol-A and epichlorohydrin.

Other coatings susceptible to crosslink curing include those which cure by crosslinking upon exposure to a source of energy for crosslinking the coating film, such as a radiant energy in the wave-length range from 3,000 to 8,000 A, electron beam, or γ-ray. Examples of such coatings are (I) unsaturated polyesters obtained by condensation of polycarboxylic acids, predominantly unsaturated polycarboxylic acids such as maleic acid and itaconic acid, with polyhydric alcohols; resin compositions comprising such unsaturated polyesters and vinyl monomers; (II) unsaturated resins comprising 2 to 12, preferably 2 to 6, recurring units of the formula:

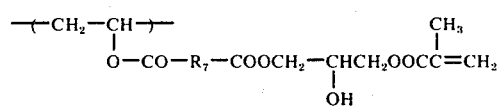

wherein $R_7$ represents an alkylene group having 2 or more carbon atoms, —CH = CH—, or

obtained by addition reaction of glycidyl methacrylate on the addition reaction products of hydroxyl-containing polymers and carboxylic anhydrides; unsaturated resins comprising 2 to 12, preferably 2 to 6, recurring units of the formula:

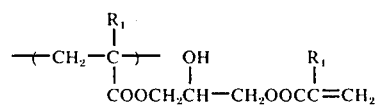

wherein $R_1$ represents hydrogen atom or methyl group; unsaturated compounds such as ethylene glycol dimethacrylate, diethylene glycol dimethacrylate, trimethylolpropane triacrylate; esterification products of epoxy prepolymers having 2 or more epoxy groups in the molecule with acrylic acid or methacrylic acid; and mixtures of these unsaturated compounds and vinyl monomers. Among the above-noted unsaturated compounds, particularly preferred are those which contain major amounts of components having 0.5 to 12 (meth-)acryloyloxy groups per molecular weight of 1,000, in view of the coating film characteristics.

In order to effect crosslinking of the coating prepared from the above-said unsaturated compound by exposure to light to form cured film, the coating composition which has been admixed with a photopolymerization catalyst, such as benzoin, benzoin methyl ether, benzoin butyl ether, 2-phenylthioacetophenone, benzil, butyroin, anthraquinone, or naphthoquinone, is applied and exposed to the light of wavelengths in the range from 2,000 to 8,000 Å, particularly from 3,000 to 5,000 Å.

In order to effect crosslink-curing of the coatings containing predominant amount of the above-said unsaturated resins by exposure to radiation, the coating applied on the article is exposed to an electron beam of a dose rate of 0.1 to 20 Mrad/second emitted from an electron beam acclerator under an applied accelerating voltage of 0.1 2 MeV so that the absorption dose may become 0.1 to 20 Mrad.

The coating materials mentioned above can be used in various forms such as solventless-type, organic solvent-type, water-containing solvent-type, aqueous-type, and powder-type coatings.

Owing to the hydroxyl-containing vinyl monomer and/or the epoxy-containing vinyl-monomer incorporated in its formulation, the molding compound of this invention yields a FRP molded article which is very favorable not only in adhesion to the cured coating film formed from the above-said coating materials, but also in surface evenness. Thus, the present invention provides a molding compound capable of being fabricated to a coated FRP molded articles having both decorative appearance and excellent physical and chemical properties, leading to expansion of the use fields of FRP and to development of associated industries.

The acrylic coatings comprise solution of the aforesaid copolymers and, if necessary, aminoplasts and epoxy compounds. When such an acrylic coating composition is to be used in manufacturing a coated FRP article with decorative finish, the coating composition is made into a colored enamel by addition of titanium oxide, metal powders, metal flakes, carbon black, cadmium yellow, silica, alumina, etc., and, in addition, organic pigments such as Phthalocyanine Blue, Phthalocyanine Green, and the like.

In the present invention, the unsaturated polyester resin composition is first formed into BMC or SMC and then molded in a mold under application of heat and pressure to obtain thus a FRP molded article excellent in surface evenness and dimensional accuracy without showing warpage nor sink-mark. The molded article is then coated with a coating composition as mentioned above and baked at, for example, 120° to 200° C. for 30 minutes.

When an acrylic coating is applied, the resulting coated FRP article is superior in gloss, appearance, and weatherability to that obtained by using other coatings such as, for example, an alkyd-, melamine-, and unsaturated polyester-type.

The invention is illustrated below in further detail with reference to Examples, but the invention is not limited to Examples. In Examples, all parts are by weight.

EXAMPLE 1

SMC was prepared from each of the compositions comprising shrinkage-reducing agents, unsaturatdd polyester resins, fillers, and curing agents in the ratios as given in Table 1. Each SMC was treated at 150° C. and 100 kg/cm² for 3 minutes to obtain a FRP molded article.

Table 1

(Unit: parts by weight)

| Sample Component | A | B | B' | C | C' | D | E | F | G |
|---|---|---|---|---|---|---|---|---|---|
| Unsaturated polyester[1] | 16.8 | 16.8 | 16.8 | 16.8 | 16.8 | 16.8 | 16.8 | 16.8 | 16.8 |
| Shrinkage-reducing agent (I)[2] | 11.2 | 11.2 | 11.2 | 11.2 | 11.2 | 11.2 | 11.2 | 11.2 | — |
| Shrinkage-reducing agent (II)[3] | — | — | — | — | — | — | — | — | 11.2 |
| 2-Hydroxypropyl methacrylate | — | 1.4 | — | — | — | — | — | — | — |
| Polyethylene glycol monomethacrylate[4] | — | — | — | 1.4 | — | — | — | — | — |
| Glycidyl methacrylate | — | — | 1.4 | — | — | — | — | — | — |
| Allyl glycidyl ether | — | — | — | — | 1.4 | — | — | — | — |
| Dimethylaminoethyl methacrylate | — | — | — | — | — | 1.4 | — | — | — |
| Acrylamide | — | — | — | — | — | — | 1.4 | — | — |
| Vinyl acetate | — | — | — | — | — | — | — | 1.4 | — |
| Magnesium hydroxide | 0.7 | 0.7 | 0.7 | 0.7 | 0.7 | 0.7 | 0.7 | 0.7 | 0.7 |
| Calcium carbonate | 42 | 42 | 42 | 42 | 42 | 42 | 42 | 42 | 42 |
| Zinc stearate | 1.05 | 1.05 | 1.05 | 1.05 | 1.05 | 1.05 | 1.05 | 1.05 | 1.05 |
| Glass fiber 1"[5] | 30 | 30 | 30 | 30 | 30 | 30 | 30 | 30 | 30 |
| tert-Butyl perbenzoate | 0.28 | 0.28 | 0.28 | 0.28 | 0.28 | 0.28 | 0.28 | 0.28 | 0.28 |

BMC was prepared by blending a shrinkage-reducing agent, unsaturated polyester, filler, and curing agent in the ratio given in Table 2, and cured at 150° C. and 100 kg/cm² for 3 minutes to obtain a FRP molded article.

Table 2

| Sample Component | H | I | I' | J | J' | K | L | M | N |
|---|---|---|---|---|---|---|---|---|---|
| Unsaturated polyester[1] | 15 | 15 | 15 | 15 | 15 | 15 | 15 | 15 | 15 |
| Shrinkage-reducing agent (I)[2] | 10 | 10 | 10 | 10 | 10 | 10 | 10 | 10 | — |
| Shrinkage-reducing agent (II)[3] | — | — | — | — | — | — | — | — | 10 |
| 2-Hydroxyethyl methacrylate | — | 1.4 | — | — | — | — | — | — | — |
| Polypropylene glycol mono- | — | — | — | 1.4 | — | — | — | — | — |

Table 2-continued

| Component | Sample H | I | I' | J | J' | K | L | M | N |
|---|---|---|---|---|---|---|---|---|---|
| methacrylate[6] | | | | | | | | | |
| Glycidyl acrylate | — | — | 1.4 | — | — | — | — | — | — |
| Allyl glycidyl ether[8] | — | — | — | — | 1.4 | — | — | — | — |
| Diacetone acrylamide | — | — | — | — | — | 1.4 | — | — | — |
| Methacrylamide | — | — | — | — | — | — | 1.4 | — | — |
| Acrylonitrile | — | — | — | — | — | — | — | 1.4 | — |
| Magnesium hydroxide | & 0.63 | & 0.63 | & 0.63 | & 0.63 | & 0.63 | & 0.63 | & 0.63 | & 0.63 | & 0.63 |
| Calcium carbonate | 55 | 55 | 55 | 55 | 55 | 55 | 55 | 55 | 55 |
| Zinc stearate | 1.5 | 1.5 | 1.5 | 1.5 | 1.5 | 1.5 | 1.5 | 1.5 | 1.5 |
| Glass fiber ¼"[17] | 20 | 20 | 20 | 20 | 20 | 20 | 20 | 20 | 20 |
| tert-Butyl perbenzoate | 0.25 | 0.25 | 0.25 | 0.25 | 0.25 | 0.25 | 0.25 | 0.25 | 0.25 |

Components shown in Tables 1 and 2: the unsaturated polyester (1) is a solution of polypropylene glycol maleate in styrene, 66 % solids content (P-340, product of Rohm and Haas Co.); the shrinkage-reducing agent (I) is a 33-% solution of a polymethyl methacrylate-based thermoplastic resin in styrene (P-681, product of Rohm and Haas Co.); the shrinkage-reducing agent (II) is a 33-% polyvinyl acetate-based thermoplastic resin in styrene (LP40A, product of Union Carbide Corporation); the polyethylene glycol monomethacrylate is Blenmer PP-1000 (product of Nippon Oils and Fats Co.); the glass fiber 1 inch (5) is a glass fiber roving cut to 1 inch length; the polypropylene glycol monomethacrylate (6) is Blenmer PE-200 (product of Nippon Oils and Fats Co.); the glass fiber ¼ inch is glass fiber strand cut to ¼ inch length; the allyl glycidyl ether (8) is Epiol A (product of Nippon Oils and Fats Co.).

PREPARATION OF COATING

Into a polymerization kettle, were charged 45 parts of styrene, 43 parts of lauryl methacrylate, 10 parts of 2-hydroxyethyl methacrylate, 2 parts of methacrylic acid, 50 parts of n-butanol, 50 parts of xylene, and 1 part of azobisisobutyronitrile. The temperature of the charge was elevated to 80° C. over a period of one hour and after 2, 4, and 6 hours, 0.5 part of azobisisobutyronitrile was added each time. Polymerization was allowed to proceed at 80° C. for 8 hours in total.

A mixture was prepared from 140 parts of the resin solution obtained above, 15 parts of a half-second cellulose acetate butyrate, and 15 parts of a methylated melamine resin. To the mixture was added 6.1 parts of Alumi Paste (an aluminum paste, 65% solids content, a product of Toyo Aluminum Co.) diluted with 6 parts of xylene. The resulting metallic enamel was diluted with a diluent solvent comprising xylene/methyl ethyl ketone/n-butanol (5/3/2) so that the viscosity of the enamel may become 17 seconds, as measured by Ford cup No. 4.

The enamel thus obtained was applied on each of the FRP molded articles, sample designations A to N, B', C', I', and J', shown in Tables 1 and 2, to a thickness of about 40 μ. The articles applied with the enamel were baked at 140° C. for 30 minutes to obtain coated FRP articles. These coated articles were subjected to the salt spray test for 10 days using a 5-% salt water, then washed with water, dried in the air and inspected for the change in appearance of the coating film. The results obtained (test for salt spray resistance) were as shown in Table 3. Rating: ⊙ no change; ○ slight blistering or slight loss in gloss; Δ blistering; × peeling.

The coating film was cross-cut at 1 mm intervals to form 100 mm squares. A piece of adhesive tape was adhered to the coating film to cover the cross-cut film and then peeled off. The squres remaining on the molded article were counted (cross-cut test). Rating: ⊙ 100 squares having remained; ○ 99 to 95 squares having remained; × 94 or less squares having remained.

Table 3

| | Adhesion (cross-cut test) | Salt spray test (10 days) | Remarks |
|---|---|---|---|
| A | ⊙ | × | |
| B | ⊙ | ⊙ | Good surface evenness |
| B' | ⊙ | ⊙ | Good surface evenness |
| C | ⊙ | ⊙ | Good surface evenness |
| C' | ⊙ | ○ | Good surface evenness |
| D | ○ | ○ | Insufficient consistency; yellowish discoloration of molded article |
| E | ○ | ○ | Insufficient consistency; depression in the surface of molded article |
| F | ⊙ | × | |
| G | ⊙ | × | |
| H | ⊙ | × | |
| I | ⊙ | ⊙ | Good surface evenness |
| I' | ⊙ | ⊙ | Good surface evenness |
| J | ⊙ | ⊙ | Good surface evenness |
| J' | ⊙ | ⊙ | Good surface evenness |
| K | ○ | × | Insufficient consistency; slightly yellowish discoloration of molded article |
| L | ○ | ○ | Insufficient consistency; depression in the surface of molded article |
| M | ○ | Δ | |
| N | ○ | × | |

Table 4

| Sample | Characteristics of coating film Gloss % | Pencil scratch test | Abrasion resistance | Gasoline resistance | Impact resistance |
| --- | --- | --- | --- | --- | --- |
| B | 94 | 2H | Good | Good | Good |
| B' | 94 | 2H | " | " | " |
| C | 92 | 2H | " | " | " |
| C' | 92 | 2H | " | " | " |
| I | 95 | 2H | " | " | " |
| I' | 95 | 2H | " | " | " |
| J | 90 | 2H | " | " | " |
| J' | 90 | 2H | " | " | " |

In Tables 3 and 4, samples B, B', C, C', I, I', J, and J' were prepared from the compositions of this invention, while other samples were for reference. It is seen that the samples according to this invention are far superior in coating film adhesion to those prepared for reference.

EXAMPLE 2

A mixture was prepared from 100 parts of styrene, 80 parts of n-butyl acrylate, 20 parts of 2-hydroxyethyl methacrylate, 100 parts of xylene, 100 parts of methyl isobutyl ketone, and 2 parts of $\alpha, \alpha'$-azobisisobutyronitrile. The temperature of the mixture was elevated to 80° C. over a period of one hour, and thereafter additional amounts of $\alpha, \alpha'$-azobisisobutyronitrile were added, 1 part each time, at two hours interval. Polymerization was continued for 9 hours in total, to obtain a resin solution of 50% solids content.

To 100 parts of the resin solution obtained above, were added 15 parts of phenol-blocked diphenylmethane diisocyanate, 1 part of N-methylmorpholine, and 50 parts of titanium oxide to obtain an enamel.

The enamel was applied on the FRP molded articles, samples A to N, B', C', I', and J', and baked at 150° C. for 20 minutes.

The coated articles thus obtained were tested for adhesion of the coating film in the same way as in Example 1. It was found that the samples B, B', C, C', I, I', J, and J' show very good adhesion, whereas other samples show partial peeling of the coating film. Performance characteristics of the coating film tested on the samples B, B', C, C', I, I', J, and J' were as shown in Table 5.

EXAMPLE 3

An epoxy-alkyd paint (828-2108 produced by Du Pont Co.) was applied on the FRP molded articles, samples A to N prepared in Example 1, and baked at 160° C. for 30 minutes. In the same manner as in Example 1, adhesion of the coating film was tested on the coated articles obtained above. It was found that very good adhesion of the coating film was shown by the samples B, B', C, C', I, I', J, and J' which were FRP molded articles prepared from the composition containing a hydroxyl-containing monomer, whereas other samples showed peeling of the coating film.

EXAMPLE 4

A copolymer was prepared by copolymerizing 65 parts of 2-hydroxyethyl methacrylate, 102 parts of styrene, and 100 parts of methyl methacrylate. To 50 parts of the copolymer dissolved in 50 parts of methyl methacrylate, were added 8 parts of maleic anhydride and 0.03 part of hydroquinone monomethyl ether. Addition reaction was allowed to proceed at 90° C. for 5 hours.

To the resulting resin solution were added 7 parts of methacrylic acid glycidyl ester and 1 part of dimethylaminoethyl methacrylate and allowed to react at 90° C. for 2 hours to obtain a solution of an unsaturated resin. A mixture of 100 parts of the said resin solution and 30 parts of titanium oxide was applied on the FRP molded samples A to N, B', C', I', and J' prepared in Example 1, and exposed to an electron beam under nitrogen atmosphere so that the absorption dose of the coating film may become 4 Mrad under the following conditions: accelerating voltage, 300 kV; current density, 15 mA; dose rate, 4 Mrad/second. The coating film was found to be completely cured.

On the other hand, a mixture of 100 parts of the above-noted solution of an unsaturated resin and 3 parts of benzoin methyl ether was applied to a thickness of 30 $\mu$ on the FRP molded articles A to N, B', C', I', and J' prepared in Example 1, and exposed for 3 minutes under nitrogen atmosphere to the radiant energy emitted from a 800-W high-pressure mercury-arc lamp at a distance of 10 cm. The coating film was completely cured.

The coated articles thus cured were tested for the adhesion of coating film in the same manner as in Example 1 and for the moisture resistance by the method mentioned below. The results obtained were as shown in Table 6.

Table 5

| Item of test | B | B' | C | C' | I | I' | J | J' |
| --- | --- | --- | --- | --- | --- | --- | --- | --- |
| Thickness of coating film, $\mu$ | 36 | 41 | 32 | 38 | 40 | 37 | 37 | 36 |
| Pencil scratch test | 3H | 3H | 2H–3H | 2H | 2H | 2H | 2H | 2H |
| Du Pont impact resistance | 30 | 35 | 35 | 40 | 30 | 35 | 40 | 40 |
| Gloss, % | 88 | 90 | 85 | 87 | 84 | 84 | 87 | 83 |

Table 6

| Item of test | A | B | B' | C | C' | D | D' | E | F | G | H | I | I' | J | J' | K | K' | L | M | N |
| --- | --- | --- | --- | --- | --- | --- | --- | --- | --- | --- | --- | --- | --- | --- | --- | --- | --- | --- | --- | --- |
| Adhesion (cross-cut test) | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| Salt spray test | Δ | ◎ | ◎ | ◎ | ◎ | ○ | ○ | ○ | X | X | Δ | ◎ | ◎ | ◎ | ◎ | ○ | ○ | ○ | ○ | X |

Table 6-continued

| Item of test \ Sample | A | B | B' | C | C' | D | D' | E | F | G | H | I | I' | J | J' | K | K' | L | M | N |
|---|---|---|---|---|---|---|---|---|---|---|---|---|---|---|---|---|---|---|---|---|
| Moisture resistance* | Δ | ◎ | ◎ | ◎ | ◎ | ○ | ○ | ○ | Δ | Δ | ○ | ◎ | ◎ | ◎ | ◎ | ○ | ○ | ○ | ○ | Δ |

Note: *Moisture resistance: Evaluated by examination of the coating film for blistering and adhesion, after having been kept at 40° C. for 30 days under the atmosphere of 100 % relative humidity.

It is seen from the results shown in Table 6 that the FRP molded articles prepared from the present unsaturated polyester composition is very favorable in adhesion and moisture resistance of the coating film.

EXAMPLE 5

In a manner similar to that in Example 1, a copolymer solution was prepared by using 38 parts of styrene, 38 parts of ethyl acrylate, 10 parts of N-butoxymethylacrylamide, 10 parts of 2-hydroxyethyl methacrylate, 4 parts of acrylic acid, 50 parts of n-butanol, 50 parts of xylene, and 0.1 parts of azobisisobutyronitrile.

In a manner similar to that in Example 1, the copolymer solution obtained above was made into an enamel to obtain a metallic coating (I).

In a manner similar to that mentioned above, a mixture of 43 parts of styrene, 38 parts of ethyl acrylate, 15 parts of N-butoxymethylmethacrylamide, and 4 parts of acrylic acid was polymerized and made into enamel to obtain a metallic coating (II).

A monomer mixture comprising 40 parts of styrene, 30 parts of ethyl acrylate, 5 parts of lauryl methacrylate, 15 parts of N-butoxymethylmethacrylamide, 5 parts of 2-hydroxyethyl methacrylate, and 5 parts of itaconic acid was polymerized in isopropanol to obtain a resin solution of 50% solids content. The resin solution was neutralized with β-dimethylaminoethanol, mixed with an amino plast, cellulose acetate butyrate, and aluminum paste as in Example 1, then diluted with water to a solids content of 30% to obtain a metallic coating (III).

An epoxy-alkyd paint (828-2108 produced by Du Pont Co.) was made into an enamel in a manner similar to that in Example 1 to obtain a metallic coating (IV).

The metallic coatings (I) to (IV) obtained as mentioned above were applied to a thickness of 40 μ on the FRP molded articles (samples B, B', C, C', I, I', J, and J') prepared in Example 1 and baked. The resulting coated articles were tested for the coating film characteristics. The results obtained were as shown in Table 7.

Table 7

| Coating | Sample | Characteristics of coating film Adhesion (cross-cut test) | Salt spray test | Gloss, % | Pencil scratch test | Gasoline resistance | Impact resistance |
|---|---|---|---|---|---|---|---|
| (I) | B | ◎ | ◎ | 94 | 2H | Good | Good |
| | B' | ◎ | ◎ | 94 | 2H | " | " |
| | C | ◎ | ◎ | 90 | H | " | " |
| | C' | ◎ | ◎ | 90 | H | " | " |
| | I | ◎ | ◎ | 89 | 2H | " | " |
| | I' | ◎ | ◎ | 89 | 2H | " | " |
| | J | ◎ | ◎ | 93 | H | " | " |
| | J' | ◎ | ◎ | 93 | H | " | " |
| (II) | B | ◎ | ◎ | 89 | 3H | " | " |
| | B' | ◎ | ◎ | 89 | 3H | " | " |
| | C | ◎ | ◎ | 90 | 2H | " | " |
| | C' | ◎ | ◎ | 90 | 2H | " | " |
| | I | ◎ | ◎ | 91 | 2H | " | " |
| | I' | ◎ | ◎ | 91 | 2H | " | " |
| | J | ◎ | ◎ | 93 | 2H | " | " |
| | J' | ◎ | ◎ | 93 | 2H | " | " |
| (III) | B | ◎ | ◎ | 90 | F | " | " |
| | B' | ◎ | ◎ | 90 | F | " | " |
| | C | ◎ | ◎ | 89 | H | " | " |
| | C' | ◎ | ◎ | 89 | H | " | " |
| | I | ◎ | ◎ | 91 | H | " | " |
| | I' | ◎ | ◎ | 91 | H | " | " |
| | J | ◎ | ◎ | 91 | H | " | " |
| | J' | ◎ | ◎ | 91 | H | " | " |
| (IV) | B | ○ | ○ | 75 | — | " | " |
| | B' | ○ | ○ | 75 | — | " | " |
| | C | ○ | ○ | 70 | — | " | " |
| | C' | ○ | ○ | 70 | — | " | " |
| | I | ○ | ○ | 73 | — | " | " |
| | I' | ○ | ○ | 73 | — | " | " |
| | J | ○ | ○ | 69 | — | " | " |
| | J' | ○ | ○ | 69 | — | " | " |

The results shown in Table 7 confirmed that the coated articles of this invention are excellent in gloss and appearance.

What is claimed is:

1. An unsaturated polyester composition for molding compounds capable of being molded into unsaturated polyester molded articles having good adhesion to coating film, which composition consists essentially of (1) 20 to 70 parts by weight of an unsaturated polyester obtained by condensing an acid component comprising predominantly an α, β-ethylenically unsaturated dicarboxylic acid with a polyol, (2) 25 to 75 parts by weight of a vinyl monomer copolymerizable with said unsaturated polyester (1), (3) 1 to 25 parts by weight of a thermoplastic polymer as a shirnkage-reducing agent (4) hydroxyl-group-containing vinyl monomers in a ratio of 1 to 40 parts by weight to 100 parts by weight of said unsaturated polyester (1), the sum of (1), (2), (3), and (4) being 100 parts by weight.

2. An unsaturated polyester composition for molding compounds according to claim 1, wherein the component (4) is a hydroxyl-group-containing vinyl monomer selected from the group consisting of mono-, di-, and tri-hydroxy-unsaturated compounds obtained by mono-esterification of polyols having 2 to 6 carbon atoms with $\alpha,\beta$-ehtylenically unsaturated monocarboxylic acids.

3. An unsaturated polyester composition for molding compounds according to claim 1, wherein the component (4) is a hydroxyl-group-containing vinyl monomer selected from the group consisting of mono-, di-, and tri-hydroxy-unsaturated compounds obtained by monoesterification of compounds of the formula,

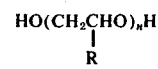

(R is H or CH$_3$, n is an integer from 2 to 6 with $\alpha,\beta$-ethylenically unsaturated monocarboxylic acids.

4. An unsaturated polyester composition for molding compounds according to claim 1, wherein the vinyl monomer (2) is styrene.

5. An unsaturated polyester composition according to claim 1, wherein the shrinkage-reducing agent is at least one thermoplastic polymer selected from the group consisting of homopolymers of acrylates or methacrylates having alkyl groups of 1 to 4 carbon atoms, copolymers of at least two monomers selected from the group consisting of acrylates and methacrylates having alkyl groups of 1 to 4 carbon atoms, and copolymers of 95 to 99.5% by weight of at least one monomer selected from the group consisting of acrylates and methacrylates having alkyl groups of 1 to 4 carbon atoms and 0.5 to 5% by weight of $\alpha, \beta$-monoethylenically unsaturated carboxylic acids.

* * * * *